US012665885B2

(12) United States Patent
Rácz et al.

(10) Patent No.: US 12,665,885 B2
(45) Date of Patent: Jun. 23, 2026

(54) TECHNIQUE FOR SELECTING A TRANSMISSION MODE FOR WIRELESSLY TRANSMITTING A MESSAGE COMPRISING CONTROL INFORMATION FOR ROBOTIC DEVICE CONTROL

(71) Applicant: Telefonaktiebolaget LM Ericsson (publ), Stockholm (SE)

(72) Inventors: Sándor Rácz, Cegléd (HU); Geza Szabo, Kecskemét (HU); Norbert Reider, Tényö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1216 days.

(21) Appl. No.: 17/617,034

(22) PCT Filed: Jun. 24, 2019

(86) PCT No.: PCT/EP2019/066705
§ 371 (c)(1),
(2) Date: Dec. 7, 2021

(87) PCT Pub. No.: WO2020/259796
PCT Pub. Date: Dec. 30, 2020

(65) Prior Publication Data
US 2022/0234211 A1     Jul. 28, 2022

(51) Int. Cl.
*H04L 9/40*          (2022.01)
*B25J 9/16*          (2006.01)
(Continued)

(52) U.S. Cl.
CPC ........ *H04L 63/0428* (2013.01); *B25J 9/1689* (2013.01); *G05B 19/4185* (2013.01);
(Continued)

(58) Field of Classification Search
CPC .............. H04L 63/0428; B25J 9/1689; G05B 19/4185; G05B 2219/31162; G05B 2219/31257
See application file for complete search history.

(56) References Cited

U.S. PATENT DOCUMENTS

| | | | | |
|---|---|---|---|---|
| 5,950,127 A | * | 9/1999 | Nitta ................. | H04B 7/18563 455/552.1 |
| 7,245,913 B1 | * | 7/2007 | Nguyen ............... | H04W 88/06 455/435.2 |

(Continued)

FOREIGN PATENT DOCUMENTS

| | | |
|---|---|---|
| CN | 103700921 A | 4/2014 |
| CN | 104858876 A | 8/2015 |

(Continued)

OTHER PUBLICATIONS

3GPP, "3GPP TS 23.503 V15.1.0", 3rd Generation Partnership Project; Technical Specification Group Services and System Aspects; Policy and Charging Control Framework for the 5G System; Stage 2 (Release 15), Mar. 2018, 1-65.

(Continued)

*Primary Examiner* — David Garcia Cervetti
(74) *Attorney, Agent, or Firm* — Sage Patent Group

(57) ABSTRACT

An apparatus for selecting a transmission mode for wirelessly transmitting a message comprising control information for robotic device control is provided. The apparatus is configured to compare a current message with a previous message to identify a change in the control information, and to select one of a normal transmission mode and a robust transmission mode, wherein the robust transmission mode is selected if a change in the control information is identified. In another variant, the apparatus is configured to obtain a count of consecutively not correctly received messages, and to select one of a normal transmission mode and a robust (Continued)

300

COMPARE CURRENT MESSAGE WITH PREVIOUS MESSAGE TO IDENTIFY CHANGE IN CONTROL INFORMATION — S402

SELECT ONE OF NORMAL TRANSMISSION MODE AND ROBUST TRANSMISSION MODE — S404

TRIGGER WIRELESS TRANSMISSION WITH THE SELECTED TRANSMISSION MODE — S406 transmission mode based on the obtained count, wherein the robust transmission mode is selected if the count equals or approaches a threshold. The apparatus is also configured to trigger wireless transmission of the current message with the selected transmission mode.

21 Claims, 9 Drawing Sheets

(51) Int. Cl.
| | |
|---|---|
| *G05B 19/418* | (2006.01) |
| *H04L 1/00* | (2006.01) |
| *H04W 72/23* | (2023.01) |

(52) U.S. Cl.
CPC .......... *H04L 1/0003* (2013.01); *H04W 72/23* (2023.01); *G05B 2219/31162* (2013.01); *G05B 2219/31257* (2013.01)

(56) References Cited

U.S. PATENT DOCUMENTS

| | | | | | |
|---|---|---|---|---|---|
| 7,974,278 | B1 * | 7/2011 | MacAdam | ............ | H04L 49/253 |
| | | | | | 370/389 |
| 7,990,841 | B2 * | 8/2011 | Walton | ................ | H04B 7/0669 |
| | | | | | 370/208 |
| 8,126,030 | B2 * | 2/2012 | Klomsdorf | .......... | H04B 1/1027 |
| | | | | | 375/220 |
| 8,155,688 | B2 * | 4/2012 | Kim | ...................... | H04W 52/10 |
| | | | | | 455/500 |
| 8,447,299 | B1 * | 5/2013 | Nguyen | ................ | H04W 48/18 |
| | | | | | 455/435.2 |
| 8,504,021 | B1 * | 8/2013 | Blinn | ................ | H04W 36/0061 |
| | | | | | 455/432.1 |
| 8,751,407 | B1 * | 6/2014 | Murray | .................. | G06Q 30/02 |
| | | | | | 705/1.1 |
| 8,929,262 | B2 * | 1/2015 | Feuerstraeter | .... | H04L 12/40136 |
| | | | | | 370/216 |
| 9,021,167 | B2 * | 4/2015 | Kaufleitner | .......... | H04L 63/168 |
| | | | | | 710/105 |
| 9,407,950 | B2 * | 8/2016 | Natani | .................. | G08C 19/00 |
| 9,497,798 | B2 * | 11/2016 | Kazmi | ................ | H04W 52/36 |
| 9,949,279 | B2 * | 4/2018 | Simonsson | .......... | H04W 24/10 |
| 10,051,542 | B1 * | 8/2018 | Mansour | ............... | H04W 36/08 |
| 10,448,411 | B1 * | 10/2019 | Jorgovanovic | ...... | H04L 43/0829 |
| 10,694,362 | B2 * | 6/2020 | Baker | .................. | H04W 12/02 |
| 10,980,079 | B2 * | 4/2021 | Huang | ............. | H04W 36/0011 |
| 11,575,832 | B2 * | 2/2023 | Harada | .................. | H04N 23/66 |
| 11,729,685 | B2 * | 8/2023 | Ryu | .......................... | H04L 1/18 |
| | | | | | 370/331 |
| 11,950,099 | B2 * | 4/2024 | Balasubramanian | ........................ | |
| | | | | | H04W 12/02 |
| 12,008,878 | B2 * | 6/2024 | Miniard | ................. | G06Q 10/10 |
| 12,126,686 | B2 * | 10/2024 | Cho | .......................... | H04L 67/50 |
| 12,131,823 | B2 * | 10/2024 | Ren | ......................... | G16H 10/65 |
| 2003/0030568 | A1 * | 2/2003 | Lastinger | .......... | G06K 7/10297 |
| | | | | | 340/8.1 |
| 2005/0037757 | A1 * | 2/2005 | Moon | ............... | H04W 36/0072 |
| | | | | | 455/436 |
| 2005/0133467 | A1 * | 6/2005 | Trachewsky | ......... | H03G 3/3047 |
| | | | | | 210/527 |
| 2005/0228509 | A1 * | 10/2005 | James | ...................... | H04L 69/18 |
| | | | | | 710/305 |
| 2009/0010205 | A1 * | 1/2009 | Pratt, Jr. | ............. | H04W 56/002 |
| | | | | | 370/328 |
| 2009/0028184 | A1 * | 1/2009 | Carpman | ............. | G05B 19/058 |
| | | | | | 370/466 |
| 2009/0323648 | A1 * | 12/2009 | Park | ...................... | H04W 8/005 |
| | | | | | 370/338 |
| 2010/0309782 | A1 * | 12/2010 | Lee | ................... | H04W 36/0077 |
| | | | | | 370/328 |
| 2012/0163200 | A1 * | 6/2012 | Steinberger | ......... | H04L 43/0847 |
| | | | | | 370/252 |
| 2012/0250532 | A1 * | 10/2012 | Husted | .............. | H04W 74/0808 |
| | | | | | 370/252 |

| | | | | | |
|---|---|---|---|---|---|
| 2012/0322445 | A1 * | 12/2012 | Kwon | .................... | H04W 52/04 |
| | | | | | 455/436 |
| 2013/0083705 | A1 * | 4/2013 | Ma | ............................ | H04L 5/14 |
| | | | | | 370/280 |
| 2013/0196700 | A1 * | 8/2013 | Tiirola | ................. | H04J 11/0043 |
| | | | | | 455/501 |
| 2013/0230057 | A1 * | 9/2013 | Hori | ...................... | H04W 76/10 |
| | | | | | 370/466 |
| 2014/0185579 | A1 * | 7/2014 | Popovski | ............ | H04L 65/1016 |
| | | | | | 370/329 |
| 2014/0314168 | A1 * | 10/2014 | Xu | .......................... | H04B 7/061 |
| | | | | | 375/267 |
| 2015/0065073 | A1 * | 3/2015 | Yan | ...................... | H04B 7/0868 |
| | | | | | 455/133 |
| 2015/0078200 | A1 | 3/2015 | Kalkunte et al. | | |
| 2015/0089080 | A1 * | 3/2015 | Alsup | ...................... | H04L 49/90 |
| | | | | | 709/235 |
| 2015/0156286 | A1 * | 6/2015 | Blair | ........................ | H04L 67/02 |
| | | | | | 709/201 |
| 2015/0222432 | A1 * | 8/2015 | Fukuda | .................... | G09C 1/00 |
| | | | | | 380/255 |
| 2015/0230207 | A1 * | 8/2015 | Wang | ...................... | H04N 7/185 |
| | | | | | 370/329 |
| 2015/0244761 | A1 * | 8/2015 | Tsyganok | .................. | H04L 1/08 |
| | | | | | 709/219 |
| 2016/0066301 | A1 * | 3/2016 | Zhu | ...................... | H04W 72/542 |
| | | | | | 370/329 |
| 2016/0072929 | A1 * | 3/2016 | Alsup | ................. | H04L 47/2433 |
| | | | | | 370/392 |
| 2016/0112982 | A1 * | 4/2016 | Babineau | .............. | H04W 64/00 |
| | | | | | 455/456.1 |
| 2016/0149802 | A1 * | 5/2016 | Youn | ..................... | H04J 3/1652 |
| | | | | | 398/45 |
| 2016/0234313 | A1 * | 8/2016 | Kellner | ................... | H04L 69/08 |
| 2016/0329991 | A1 * | 11/2016 | Kudou | .................. | H04L 1/1628 |
| 2016/0355198 | A1 * | 12/2016 | Dulmage | ............ | B61L 15/0072 |
| 2017/0063442 | A1 * | 3/2017 | Kazmi | ................. | H04B 7/0689 |
| 2017/0127221 | A1 * | 5/2017 | Erdmann | .............. | H04W 76/28 |
| 2017/0187554 | A1 * | 6/2017 | Arditti llitzky | ....... | H04L 1/0053 |
| 2017/0280487 | A1 * | 9/2017 | Price | ..................... | G06F 21/335 |
| 2018/0054691 | A1 * | 2/2018 | Sharifi | ............. | H04M 1/72448 |
| 2018/0062251 | A1 * | 3/2018 | Kim | ........................ | H01Q 13/10 |
| 2018/0069578 | A1 * | 3/2018 | Lee | ......................... | H04B 1/406 |
| 2018/0184435 | A1 * | 6/2018 | Cariou | ............. | H04W 36/0061 |
| 2018/0279103 | A1 * | 9/2018 | Hong | ...................... | H04W 4/80 |
| 2018/0359729 | A1 * | 12/2018 | Okumura | ............. | H04B 17/318 |
| 2019/0124570 | A1 * | 4/2019 | Tsuda | ..................... | H04W 88/00 |
| 2019/0191017 | A1 * | 6/2019 | Aggarwal | .............. | H04L 69/24 |
| 2019/0210564 | A1 * | 7/2019 | Han | .................... | G05D 1/0022 |
| 2019/0271991 | A1 * | 9/2019 | Dulmage | ............... | G08G 5/53 |
| 2019/0394337 | A1 * | 12/2019 | Hassan | ............... | H04L 65/1059 |
| 2019/0394821 | A1 * | 12/2019 | Hassan | ............. | H04M 3/42263 |
| 2020/0053741 | A1 * | 2/2020 | Wang | ................... | H04W 72/044 |
| 2020/0120064 | A1 * | 4/2020 | Cho | ..................... | H04L 61/5007 |
| 2020/0128437 | A1 * | 4/2020 | Caretti | ................. | H04W 28/04 |
| 2020/0137538 | A1 * | 4/2020 | Chen | .................... | H04W 24/10 |
| 2020/0187286 | A1 * | 6/2020 | Rácz | ................. | G05B 19/4185 |
| 2020/0259896 | A1 * | 8/2020 | Sachs | ................... | H04L 63/0428 |
| 2020/0313951 | A1 * | 10/2020 | Kremser | ............... | H04L 41/149 |
| 2020/0351906 | A1 * | 11/2020 | Chen | ...................... | H04W 8/22 |
| 2022/0201713 | A1 * | 6/2022 | Beale | ................... | H04L 5/0053 |
| 2023/0111284 | A1 * | 4/2023 | Gildert | .................. | B25J 9/1661 |
| | | | | | 700/250 |
| 2024/0217432 | A1 * | 7/2024 | Koller | ..................... | B60Q 3/10 |
| 2025/0063647 | A1 * | 2/2025 | Crafts | ..................... | H02J 4/00 |

FOREIGN PATENT DOCUMENTS

| | | | | |
|---|---|---|---|---|
| CN | | 107113355 A | 8/2017 | |
| CN | | 108698227 A | 10/2018 | |
| WO | WO-2019007517 A1 * | | 1/2019 | ............ H04L 69/14 |

OTHER PUBLICATIONS

First Chinese Office Action mailed Jul. 8, 2023 for Chinese Patent Application No. CN 201980097679.1, 10 pages.

(56)     References Cited

OTHER PUBLICATIONS

Communication Pursuant to Article 94(3) EPC mailed on Jun. 2, 2023 for European Patent Application No. 19733024.4, 10 pages.

Szabó, Géza et al.; "Quality of Control-Aware Resource Allocation in 5G Wireless Access Networks"; 2018 IEEE 19th International Symposium on "A World of Wireless, Mobile and Multimedia Networks" (WOWMOM); Jun. 12, 2018; pp. 1-6 (6 pages).

Grandi, Raffaele et al.; "UniBot Remote Laboratory : a Scalable Web-Based Set-up for Education and Experimental Activities in Robotics"; 5th International Federation of Automatic Control (IFAC) Symposium on Modelling and Confrol in Biomedical Systems 2003; vol. 44, No. 1, 28 (2011); Melbourne, Australia; Aug. 21-23, 2003; XP093246380A; pp. 8521-8525 (5 pages).

Communication pursuant to Article 94(3) EPC mailed Feb. 10, 2025 for European Patent Application No. 19733024.4, 7 pages.

\* cited by examiner

UE 106

Comparing/Obtaining Module — 206

Selecting Module — 208

Triggering Module — 210

UE 106

Processor — 202

Memory — 204

300

S402 — COMPARE CURRENT MESSAGE WITH PREVIOUS MESSAGE TO IDENTIFY CHANGE IN CONTROL INFORMATION

S404 — SELECT ONE OF NORMAL TRANSMISSION MODE AND ROBUST TRANSMISSION MODE

S406 — TRIGGER WIRELESS TRANSMISSION WITH THE SELECTED TRANSMISSION MODE

TECHNIQUE FOR SELECTING A TRANSMISSION MODE FOR WIRELESSLY TRANSMITTING A MESSAGE COMPRISING CONTROL INFORMATION FOR ROBOTIC DEVICE CONTROL

TECHNICAL FIELD

The present disclosure generally relates to industrial automation. In particular, an apparatus for selecting a transmission mode for wirelessly transmitting a message comprising control information for robotic device control is provided. Also provided are a system comprising the apparatus, a method for selecting a transmission mode for wirelessly transmitting a message comprising control information for robotic device control, a cloud computing system configured to perform the method, a computer program, a computer-readable medium and a data carrier signal.

BACKGROUND

Existing industrial applications (including, e.g., robot arm controllers or robot cell controllers) typically run on programmable logic controllers, PLCs, and use a fieldbus protocol like ProfiNet to transmit messages to robotic devices and receive messages from the devices. The Profi-Net protocol is an Ethernet based protocol which supports real-time communication between industrial applications. According to the ProfiNet protocol, messages are sent with a predefined update time. The ProfiNet protocol defines a threshold for a count of consecutively not correctly received packages. In other words, the protocol defines a count of tolerated message losses specified by a retry parameter.

When the count of consecutively not correctly received messages reaches or exceeds the threshold, the industrial application running on the PLC is notified, and emergency actions are executed. According to such emergency actions, typically the whole robotic cell is stopped. The ProfiNet protocol uses a memory map-like operation. In more detail, the application reads/writes a memory area in the PLC and the ProfiNet protocol keeps a mirrored version in the device up-to-date, and vice-versa.

Existing solutions are designed for traditional robotic cells in which all devices are connected through reliable wired connections. In such implementations, any problem in communication means that most probably the robotic device or its controller is physically damaged, and the robotic device must stop.

In future industrial applications, some devices will be connected through wireless connection, but still also use the fieldbus technology. However, wireless connections are often not as reliable connection as wired connections, even if several radio mechanisms are introduced to eliminate or reduce a radio uncertainty from the connection, such as modulation, Hybrid Automatic Repeat Request (H-ARQ), Radio Link Control (RLC) or multi-connectivity.

Existing wireless transmission protocols do not consider aspects relating to fieldbus-based connections and industrial applications. Instead, they focus on improving the characteristics of the wireless connection independently from the involved industrial automation protocols or mechanisms mentioned above. On the other hand, industrial automation protocols and wired gateways do not consider message transmission as a limited resource, which is the case in wireless communication over scarce spectrum resources.

SUMMARY

There is a need for a technique of enabling reliable transmission of messages comprising control information for robotic device control over a wireless connection.

According to a first aspect, an apparatus for selecting a transmission mode for wirelessly transmitting a message comprising control information for robotic device control is provided. The apparatus is configured to compare a current message, which is to be transmitted after a previous message, with the previous message to identify a change in the control information from the previous message to the current message. The apparatus is further configured to select one of a normal transmission mode and a robust transmission mode which is more robust than the normal transmission mode for wireless transmission of the current message. The apparatus is configured to select the robust transmission mode if a change in the control information is identified and to trigger wireless transmission of the current message with the selected transmission mode.

The wireless transmission may be based on message acknowledgements, such as HARQ mechanisms. As such, correct receipt of the previous message may have been acknowledged. The acknowledgement may have happened prior to the comparison step.

The apparatus may be configured to compare the current message with the previous message by obtaining at least one part of the control information comprised in the current message, obtaining at least one part of the control information comprised in the previous message and comparing the at least one part of the control information comprised in the current message with the at least one part of the control information comprised in the previous message. In one variant, the apparatus is configured to obtain the at least one part of the control information comprised in the current message by masking at least one part of the current message to define at least one masked part and at least one unmasked part of the current message and extracting the at least one unmasked part of the current message as the at least one part of the control information comprised in the current message.

The apparatus is in one example configured to obtain the at least one part of the control information comprised in the previous message by masking at least one part of the previous message to define at least one masked part and at least one unmasked part of the previous message and by extracting the at least one unmasked part of the previous message as the at least one part of the control information comprised in the previous message. The apparatus may in particular be configured to mask at least one of a protocol field comprised in the message and a message part which has no effect on a reaction time of a robotic device to be controlled. On the other hand, specific control information such as commands relating to movement of the robotic device or feedback information from the robotic device for generation of the next command may have an effect on reaction time and, thus, may not be masked.

For example, the apparatus is configured to apply a plurality of different masks to define at least one masked part and at least one unmasked part for each of the different masks, wherein each one of the plurality of masks has an associated priority level. The apparatus may further be configured to extract the at least one unmasked part as the at least one part of the control information separately for each one of the plurality of masks.

The apparatus is for example configured to compare the at least one unmasked part of the control information comprised in the current message with the at least one unmasked part of the control information comprised in the previous message, for each one of the plurality of masks, to identify a change in the control information from the previous message to the current message. The apparatus may further be configured to determine one of the plurality of masks associated with the change in the control information and select the robust transmission mode based on the priority level associated with the determined mask. The apparatus may specifically be configured to determine one of the plurality of masks based on which a change in the control information from the previous message to the current message is identified.

According to one variant, the apparatus is configured to compare the current message with the previous message by obtaining a first hash of the at least one part of the control information comprised in the current message, obtaining a second hash of the at least one part of the control information comprised in the previous message, and comparing the first hash with the second hash. For example, the apparatus is configured to identify a change in the control information from the previous message to the current message based on a result of comparing the first hash with the second hash. The apparatus may in particular be configured to identify a change in the control information from the previous message to the current message in case the first hash is not equal to the second hash.

For example, the robust transmission mode comprises transmitting the current message more often than with the normal transmission mode. Alternatively, or in addition, the robust transmission mode comprises transmitting the current message using a modulation scheme which is more robust than a modulation scheme of the normal transmission mode.

According to a second aspect, an apparatus for selecting a transmission mode for wirelessly transmitting a message comprising control information for robotic device control is provided. A robot communication protocol based on which a robotic device can receive or send messages defines a threshold for a count of consecutively not correctly received messages. The robotic device is configured to perform an emergency action in case the count exceeds the threshold. The apparatus is configured to obtain a count of consecutively not correctly received messages and to select one of a normal transmission mode and a robust transmission mode which is more robust than the normal transmission mode based on the obtained count. The apparatus is further configured to select the robust transmission mode if the count equals or approaches the threshold and to trigger wireless transmission of the message with the selected transmission mode.

The message of the second apparatus aspect may correspond to the current message of the first apparatus aspect. The first apparatus aspect and the second apparatus aspect may be combined in a single apparatus or as two co-located apparatuses in a single system.

The apparatus of the second aspect is for example configured to obtain the count of consecutively not correctly received messages by obtaining a positive feedback message (also referred to as ACK) or a negative feedback message (also referred to as NACK), the positive feedback message indicating that a transmitted message has been correctly received, and the negative feedback message indicating that a transmitted message has not been correctly received. The apparatus may further be configured to obtain the count of consecutively not correctly received messages based on the obtained feedback message.

In one example, the apparatus of the second aspect is configured to increase the obtained count of consecutively not correctly received messages if, after transmitting the message, a negative feedback message is obtained, or if, after transmitting the message, no positive feedback message is obtained. For example, the count may be incremented with each consecutively received NACK, including the first NACK received. The count may also be incremented in case neither an ACK nor a NACK is received for a particular message transmission (e.g., within a predefined period of time following the particular message transmission). The count may be zeroed in response to each received ACK.

The robust transmission mode may comprise at least one of transmitting the message more often than with the normal transmission mode, and transmitting the message using a modulation scheme which is more robust than a modulation scheme of the normal transmission mode.

The apparatus of the first aspect of the second aspect may be configured to be connected to the robotic device (or to a local robot controller of the robotic device) via a fieldbus connection.

According to a third aspect, a system is provided which comprises the apparatus of the first aspect and/or the apparatus of the second aspect and the robotic device. At least a portion of a communication link between the apparatus and the robotic device may be a fieldbus connection.

The robotic device for example comprises the robot controller configured to control the robotic device based on control information comprised in a message received by the apparatus.

The robotic device may comprise a robot controller configured to generate the current message comprising the control information based on a current state of the robotic device. The robot controller may be configured to generate the message comprising the control information based on a current state of the robotic device.

The apparatus of the first aspect or of the second aspect may be configured to be connected to a controller via a fieldbus connection. The controller may be located in a computing cloud.

Also, according to a fourth aspect, a system is provided which comprises the apparatus of the first aspect or the second aspect and a controller, wherein at least a portion of a communication link between the apparatus and controller is a fieldbus connection. The controller is for example configured to determine desired control information based on control information comprised in a message received by the apparatus.

The controller is in one variant configured to generate the message comprising the control information. The controller may be configured to generate the current message comprising the control information.

According to a fifth aspect, a system is provided. The system comprises the apparatus of the first aspect or the apparatus of the second aspect. The system further comprises at least one of the apparatus of the first aspect, the apparatus of the second aspect and the apparatus comprised in the system of the third aspect.

Alternatively, the system comprises the apparatus of the first aspect or the apparatus of the second aspect, and the system of the fourth aspect.

The system in one variant comprises at least one of the apparatus of the first aspect, the apparatus of the second aspect and the apparatus comprised in the system of the third aspect. The system in this case further comprises the system of the third aspect.

The system for example comprises the system of the third aspect and the system of the fourth aspect.

According to a sixth aspect, a method for selecting a transmission mode for transmitting a message comprising control information of a robotic device is provided. The method comprises comparing a current message, which is to be transmitted after a previous message, with the previous message to identify a change in the control information from the previous message to the current message. The method further comprises selecting one of a normal transmission mode and a robust transmission mode which is more robust than the normal transmission mode, wherein the robust transmission mode is selected if a change in the control information is identified. In addition, the method comprises triggering wireless transmission of the current message with the selected transmission mode.

According to a seventh aspect, a method for selecting a transmission mode for transmitting a message comprising control information for robotic device control is provided. A robot communication protocol based on which a robotic device can receive or send messages defines a threshold for a count of consecutively not correctly received messages. The robotic device performs an emergency action in case the count exceeds the threshold. The method comprises obtaining a count of consecutively not correctly received messages and selecting one of a normal transmission mode and a robust transmission mode which is more robust than the normal transmission mode, wherein the robust transmission mode is selected if the count equals or approaches the threshold. In addition, the method comprises triggering wireless transmission of the message with the selected transmission mode.

At least one of the method of the sixth aspect and the method of the seventh aspect may be performed by the apparatus of the first aspect, the apparatus of the second aspect or the apparatus comprised in the system of the third aspect.

According to an eighth aspect, a cloud computing system is provided which is configured to perform at least one of the method of the sixth aspect and the method of the seventh aspect. The cloud computing system may comprise distributed cloud computing resources that jointly perform at least one of the method of the first aspect and the method of the second aspect under control of one or more computer program products. For example, at least one of the apparatus of the first aspect, the apparatus of the second aspect and the apparatus comprised in the system of the third aspect may be a part of the cloud computing system.

According to a ninth aspect, a computer program is provide computer program comprises instructions which, when the program is executed by a processor, cause the processor to carry out at least one of the method of the first aspect and the method of the second aspect. The computer program may also be provided for download via a network connection.

According to a tenth aspect, a computer-readable medium comprising the computer program of the ninth aspect is provided.

According to an eleventh aspect, a data carrier signal carrying information which represents the computer program of the ninth aspect is provided.

Furthermore, a computer-readable medium comprising the computer program is provided, and a data carrier signal carrying information which represents the computer program.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1A:
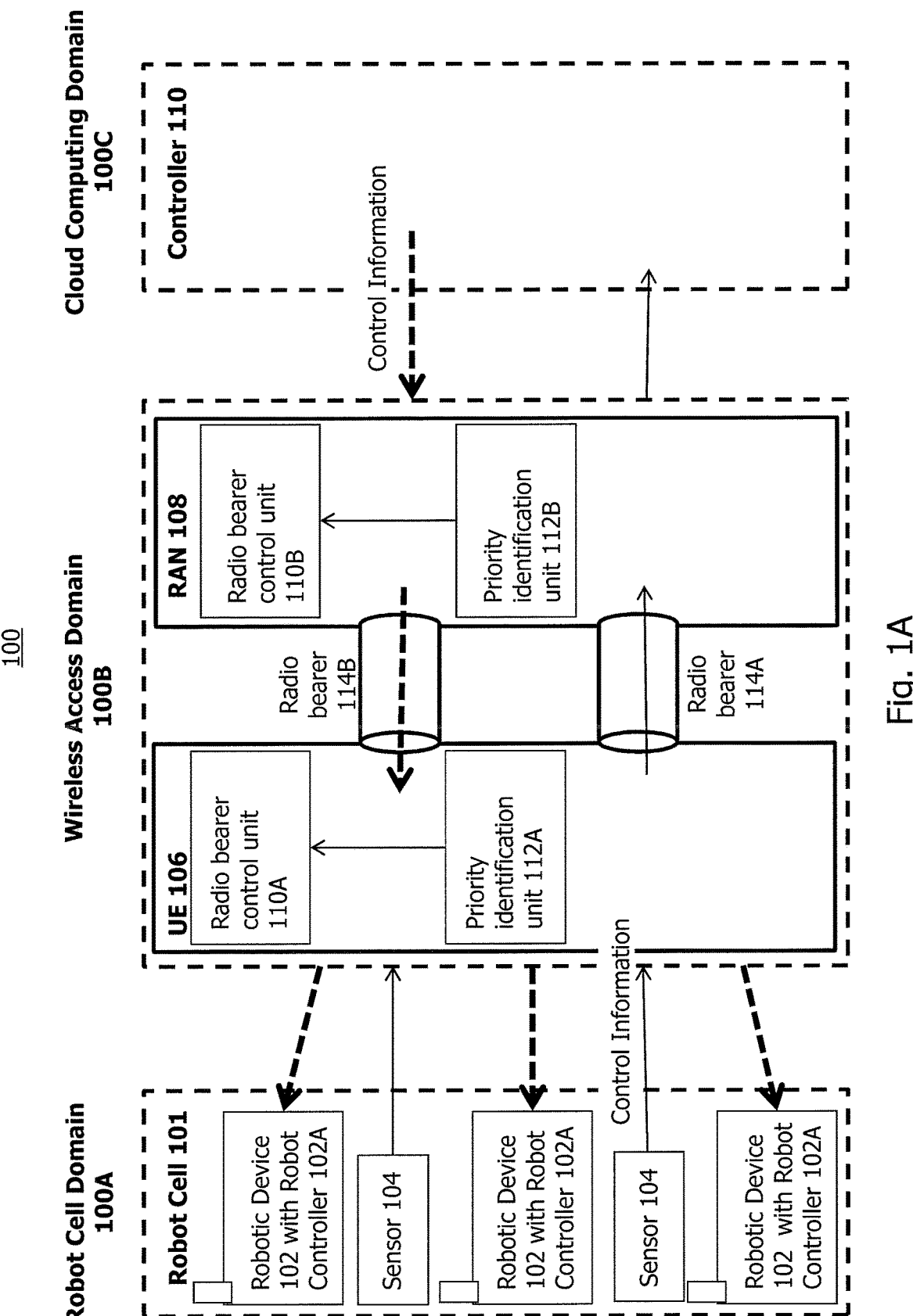
FIGS. 1A & B illustrate network system embodiments of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio access network types such as $5^{th}$ Generation (5G) networks, the present disclosure can also be implemented in connection with other radio access network types or using fully wired (e.g., fieldbus) connections. Moreover, while certain aspects in the following description will exemplarily be described in connection with cellular networks, particularly as standardized by 3GPP, the present disclosure is not restricted to any specific wireless access type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1A illustrates an embodiment of a network system 100 for computing cloud-based robot cell control. As shown in FIG. 1A, the network system 100 comprises a robot cell domain 100A, a wireless access domain 100B as well as a cloud computing domain 100C.

The robot cell domain 100A comprises at least one robot cell 101 with multiple robotic devices 102 each having a dedicated local robot controller 102A in association therewith. Each of the robotic devices 102 can comprise various actuators that jointly define a robot arm movable within multiple degrees of freedom. Two or more of robotic devices 102 within the robot cell 101 may collaboratively work on the same task (e.g., on the same work product).

The robot cell domain 100A further comprises multiple sensors 104 such as cameras, position sensors, orientation sensors, movement sensors, and so on. The sensors 104 generate sensor data indicative of a state of at least one robotic device 102 comprised in the robot cell 101 (i.e., cell state data). The sensors 104 can be freely distributed in the robot cell 101. One or more of the sensors 104 can also be integrated into one or more of the robotic devices 102.

In some implementations the sensor data provided by the sensors 104 constitute feedback data, in particular for a closed-loop control of at least one of the robotic devices 102. At least one of the sensors 104 may be a camera. In robotics, visual servoing, also known as vision-based control, is a technique which uses a visual feedback to control the motion(s) of one or more of the robotic devices 102. There are two fundamental configurations: eye-in-hand, where the camera 104 is attached to a robotic arm of the robotic device 102 and configured to observe a relative position of a target, and eye-to-hand, where the camera 104 is fixed relative to the robotic arm and configured to observe a target and a motion of the robotic arm 102.

The wireless access domain 100B may comprise a cellular or non-cellular network, such as a cellular network specified by 3GPP. In some implementations, the wireless access domain 100B may be compliant with the 3GPP standards according to Release R15, such as TS 23.503 V15.1.0 (2018-3) or later.

As illustrated in FIG. 1A by dashed arrows, the robotic devices 102 with their associated robot controllers 102A are configured to receive via the wireless access domain 100B control information for robotic device control generated in the cloud computing domain 100C. Moreover, as indicated by regular arrows, the sensors 104 are configured to provide the feedback data as control information for robotic device control via the wireless access domain 100B to the cloud computing domain 100C.

The wireless access domain 100B generally comprises equipment that enables a wireless communication between the robot cell domain 100A on the one hand and the cloud computing domain 100C on the other hand via the wireless access domain 100B. The equipment may comprise a base station of a radio access network (RAN) or a wireless access point interfacing the cloud computing domain 100C and a wireless terminal device interfacing the robot cell domain 100A). In the specific example shown in FIG. 1A, the wireless access domain 100B comprises a user equipment (UE) 106 interfacing the robot cell domain 100A and an RAN 108 interfacing the could computing domain 100C. The communication link between the UE 106 and the robot cell domain 100A may comprise or consist of a wired connection (e.g., using a fieldbus such as ProfiNet). In a similar manner, the communication link between the RAN 108 and the cloud computing domain 100C may comprise or consist of a wired connection (e.g., using a fieldbus such as ProfiNet).

UE 106 comprises a radio bearer control unit 110A and a priority identification unit 112A. The priority identification unit 112A is configured to analyze a message comprising control information for robotic device control (e.g., as determined by one of the sensors 104) and to select a transmission mode for wireless transmission of the message to wireless access domain 100B. The radio bearer control unit 110A is configured to set up a radio bearer 114A for message transmission accordingly. RAN 108 has a closely similar configuration to UE 106. RAN 108 comprises a radio bearer control unit 110B and a priority identification unit 112B. The priority identification unit 112B is configured to analyze a message comprising control information for robotic device control and to select a transmission mode for wireless transmission of the message to UE 106. The radio bearer control unit 110B is configured to set up radio bearer 114B for message transmission accordingly.

As further illustrated in FIG. 1A, the cloud computing domain 100C comprises a controller 110 which is configured to determine control information for robotic device control based on feedback data received from the sensors 104 via wireless access domain 100B. The controller 110 is composed of cloud computing resources. The control information generated by the controller 110 may include movement instructions for a movement trajectory of at least one of the robotic devices 102. The movement instruction for a particular robotic device may be generated by the controller 110 based on control information (i.e., feedback data) obtained for that robotic device from an associated sensor 104.

The robot controller 102A in the robot cell domain 100A and the controller 110 in the cloud computing domain 100C communicate with each other using a dedicated industrial automation communication protocol such as a fieldbus protocol (e.g., based on ProfiNet). The fieldbus protocol works symmetrically in both uplink, UL, and downlink, DL, directions. Based on the fieldbus protocol, the robotic device 102 can receive messages from the controller 110 or send messages to the controller 110. The fieldbus protocol may also be used to transmit messages from robot controller 102A to the controller 110 and to transmit messages from the controller 110 to robot controller 102A.

As can be seen in FIG. 1A, the same functionality is implemented in both UL and DL directions. In other words, UE 106 and RAN 108 are configured in a closely similar manner: In UE 106 and also in RAN 108, a message is first analyzed by the priority identification units 112A, 112B. The priority identification unit 112A, 112B may perform their analyses based on shallow packet inspection or deep packet inspection techniques. The radio bearer control units 110A, 110B then sets up the radio bearer 114A, 114B based on a result of the analysis.

The fieldbus protocol in some variants defines a threshold for a count of consecutively not correctly received messages, for example a threshold of 3, 6 or 9. The robotic devices 102 may be configured to perform an emergency action under control of the associated robot controller 10A in case the local count exceeds the threshold, for example an emergency stop. The protocol further defines a time interval at which messages are to be transmitted, for example a time interval of 1 ms up to 512 ms for real-time communication.

The feedback data as acquired by the sensors 104 are communicated to the cloud computing domain 100C to inform same about the state of the robot cell 101. Processing of the feedback data (e.g., in the context of inverse kinematics) at least partially takes place in the cloud computing domain 100C. The processed feedback data may then form the basis for movement instruction generation by the controller 110 in the computing cloud domain 100C, wherein the control information comprises the movement instruction. Additionally, or in the alternative, movement instruction generation in the cloud computing domain 100C is based on actions defined in an action plan for one or more of the robotic devices 102. The control information as received by the controller 110 from the robot cell 101 may include the feedback data. Also in this case, the control information is usable for robotic device control since it forms the basis for the determination of the movement instructions.

In more detail, the sensors 104 are configured to transmit a message comprising feedback data as control information to UE 106 via a fieldbus connection. UE 106 is configured to trigger wireless transmission of the message comprising the feedback data over radio bearer 114A to RAN 108. The RAN 108 is configured to receive the message that will then be forwarded via a fieldbus connection to the controller 110 in the cloud computing domain 100C.

Controller 110 is configured to generate a message comprising a movement instruction as control information for one of the robotic devices 102. The message is generated based on the feedback data as received for the particular robotic device and/or based on an action plan as defined for the particular robotic device 102. The message is forwarded via a fieldbus connection to RAN 108. The RAN 108 is configured to trigger wireless transmission of the generated message over radio bearer 114B to UE 106. The UE 106 is configured to forward the message via a fieldbus connection. Each of the robot controllers 102A is configured to receive the message via the fieldbus connection and to control one or more individual actuators of the respective robotic device 102 based thereon.

In some variants, the robotic device 102 is or comprises a robotic arm. The robotic arm comprises multiple independently actuatable joints that define multiple degrees of freedom for robot arm movement. As understood herein, a movement instruction may pertain to the robot arm as a whole (and may thus comprise multiple sub-commands for the individual joint actuators), or it may pertain to an individual joint actuator of a multi-joint robot arm. A movement instruction pertaining to a robot arm movement may thus result in an action corresponding to a particular robot arm movement.

Figure 1B:
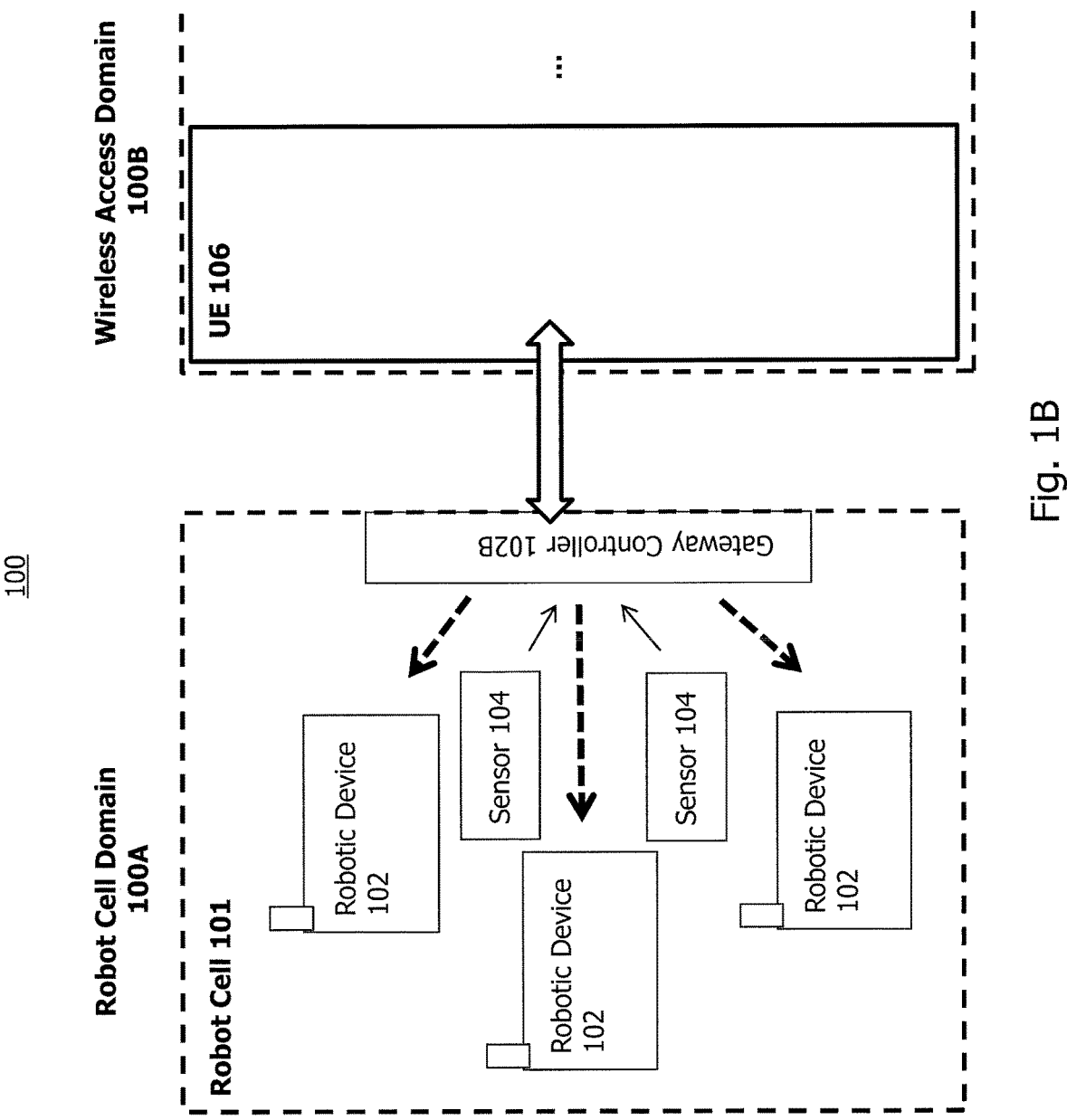

FIG. 1B illustrates an embodiment of a further network system 100 similar to the one shown in FIG. 1A. In the network system 100 of FIG. 1B, only robot cell domain 100A and UE 106 comprised in the wireless access domain 100B are shown. Note that also RAN 108 comprised in wireless access domain 100B and cloud computing domain 100C illustrated in FIG. 1A are part of the network system 100 as shown in FIG. 1B. The local robot controllers 102A of FIG. 1A are replaced by a central gateway controller 102B. This gateway controller 102B is configured to receive the messages from the wireless access domain 100B, in particular from UE 106, and to control one or more individual actuators of each of the robotic devices 102 in the robot cell 101 based thereon. The connections between the gateway controller 102B and the robotic devices 102 may be wire-based (e.g., based on fieldbuses). The connection between the gateway controller 102B and wireless access domain 100C, in particular UE 106, may be wire-based (e.g., based on a fieldbus). Using a central gateway controller 102B, a synchronous control of interworking robotic devices 102 becomes easier. The gateway controller 102B also collects the feedback data from the sensors 104 for wireless transmission of same as control information to the computing cloud domain 100C. The connections between the gateway controller 102B and the sensors 104 may be wire-based (e.g., based on a fieldbus).

The network embodiments illustrated in FIGS. 1A and 1B can be combined in various ways. For example, each robotic device 102 may comprise an associated robot controller 102A as illustrated in FIG. 1A, and the robot controllers 102A may be attached to the gateway controller 102B of FIG. 1B using wire-based connections (e.g., field buses).

Figure 2B:
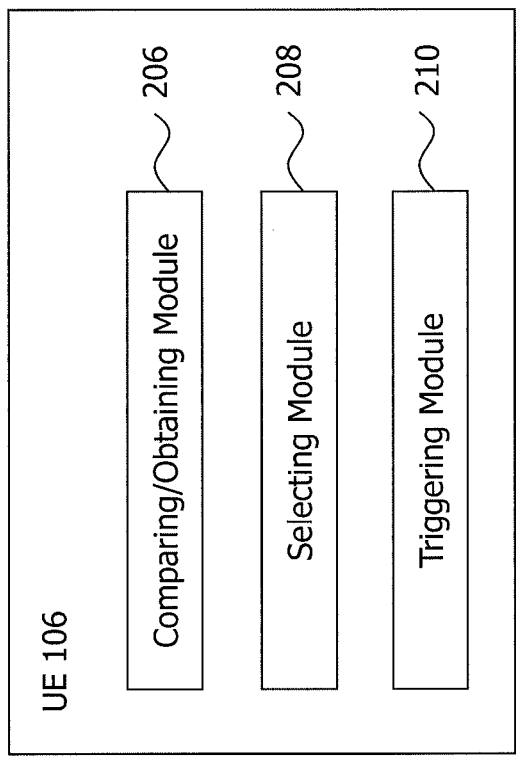
FIGS. 2A & B illustrate apparatus embodiments of the present disclosure.
Figure 2A:
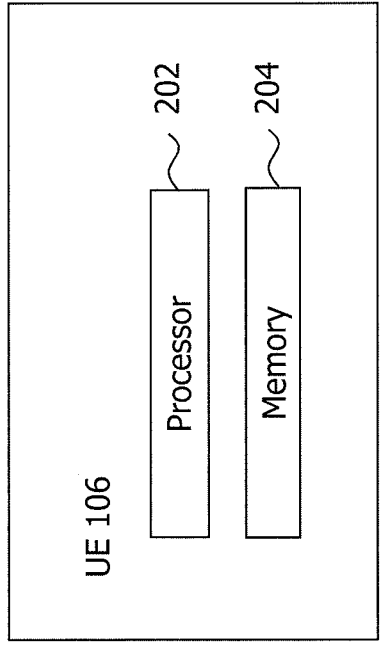

FIGS. 2A and 2B illustrate two embodiments of the UE 106 of FIGS. 1A and 1B. In the embodiment illustrated in FIG. 2A, the UE 106 comprises a processor 202 and a memory 204 coupled to the processor 202. Optionally, the UE 106 further comprises one or more interfaces for communication with other components of the network system 100 of FIGS. 1A and 1B, in particular with the robot cell domain 100A and the RAN 108. The processor 202 may be configured to implement the functions of the radio bearer control unit 110A and the priority identification unit 112A.

FIG. 2B shows an embodiment in which the UE 106 is implemented in a modular configuration. As shown in FIG. 2B, the UE 106 comprises a comparing/obtaining module 206, a selecting module 208 and a triggering module 210. These modules may be implemented by processor 202 or by circuitry, or by a combination thereof.

Figure 3B:
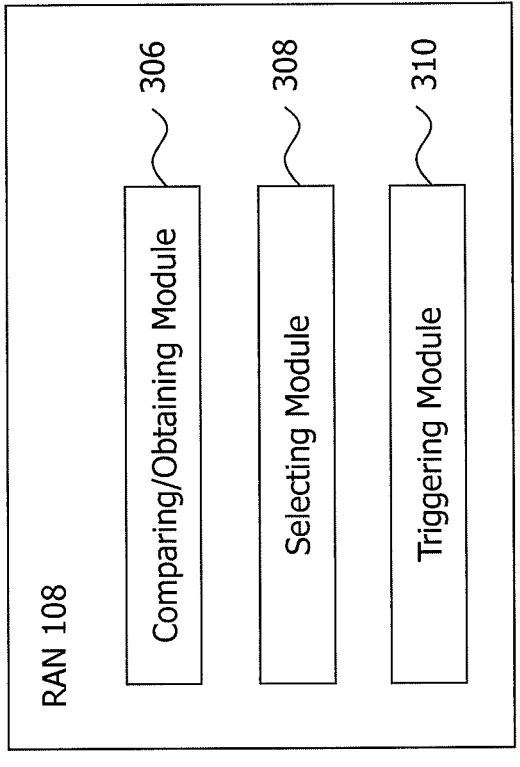
FIGS. 3A & B illustrate further apparatus embodiments of the present disclosure.
Figure 3A:
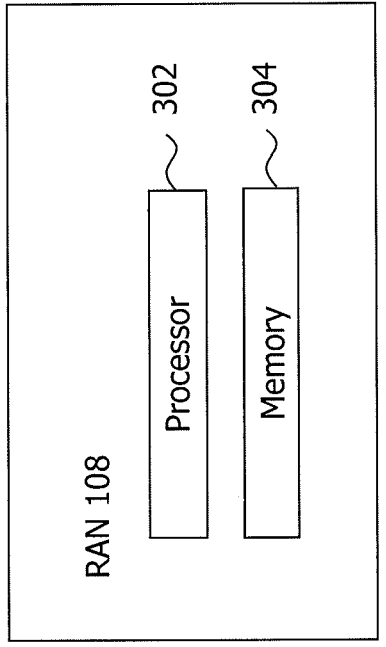

RAN 108 may be configured in a similar manner as UE 106 described above. FIGS. 3A and 3B illustrate two embodiments of the RAN 108 of FIGS. 1A and 1B. In the embodiment illustrated in FIG. 3A, the RAN 108 comprises a processor 302 and a memory 304 coupled to the processor 302. Optionally, the RAN 108 further comprises one or more interfaces for communication with other components of the network system 100 of FIGS. 1A and 1B, in particular with the cloud computing domain 100C and the UE 106. The processor 302 may be configured to implement the functions of the radio bearer control unit 110B and the priority identification unit 112B.

FIG. 3B shows an embodiment in which the RAN 108 is implemented in a modular configuration. As shown in FIG. 3B, the RAN 108 comprises a comparing/obtaining module 306, a selecting module 308 and a triggering module 310. These modules may be implemented by processor 302, by circuitry, or by a combination thereof.

Figure 4:
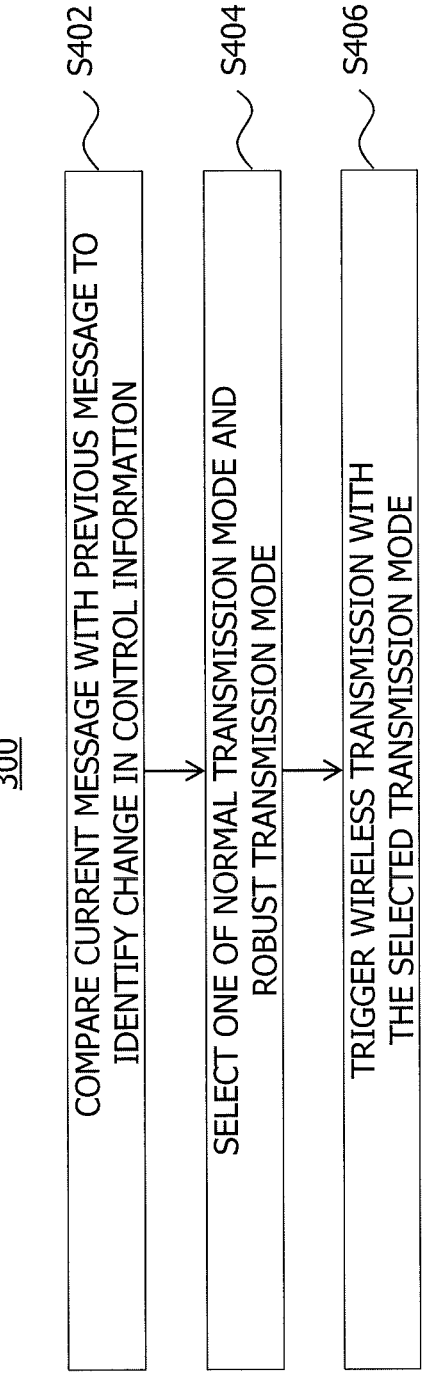
FIG. 4 illustrates a method embodiment of the present disclosure.

FIG. 4 shows a method embodiment of the present disclosure. The method is executed by at least one of the UE 106 and the RAN 108 described above with reference to FIGS. 1A, 1B, 2A, 2B, 3A and 3B. In particular, at least one of the processor 202 and the processor 302 is configured to perform the method.

In the following, in case reference is made to processor 202 and modules 206-210, it is to be understood that processor 302 and modules 306-310 may be configured in a similar manner to perform the steps mentioned below with reference to processor 202 and modules 206-210.

In step S402, a current message, which is to be transmitted after a previous message, is compared by comparing module 208 with the previous message to identify a change in the control information from the previous message to the current message. The control information is comprised in the previous message and the current message and is configured for robotic device control of the robotic device 102. Shallow packet inspection or deep packet inspection techniques may be applied in step S402 to identify the control information change from one message to the next.

In step S404, selecting module 208 selects one of a normal transmission mode and a robust transmission mode which is more robust than the normal transmission mode for wireless transmission of the current message. The selecting module 208 is configured to select the robust transmission mode if a change in the control information is identified. In step S406, triggering module 210 triggers wireless transmission of the current message with the selected transmission mode. The processor 202 may be configured to perform steps S402 to S406.

Figure 5:
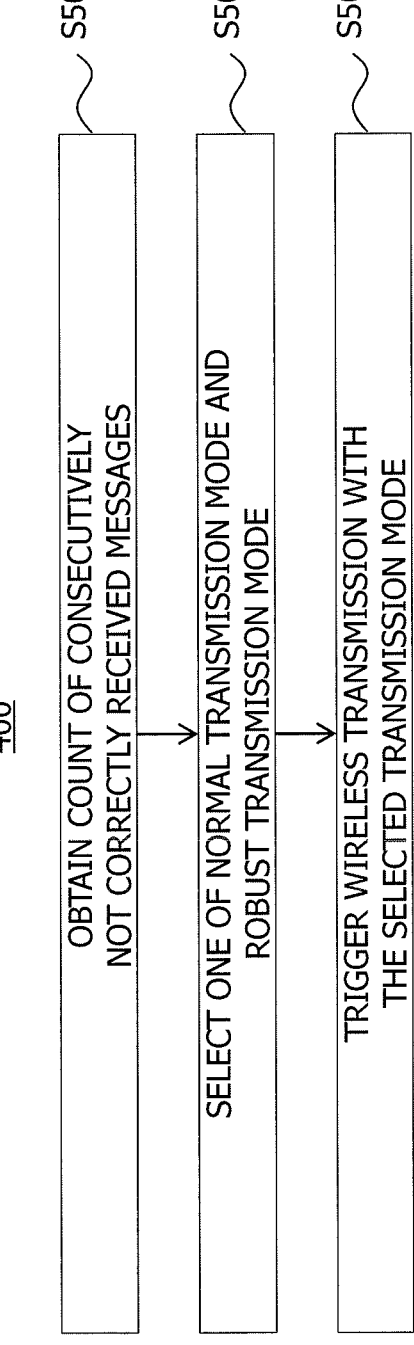
FIG. 5 illustrates a further method embodiment of the present disclosure.

FIG. 5 shows another method embodiment of the present disclosure. The method may be executed by at least one of the UE 106 and the RAN 108 described above with reference to FIGS. 1A, 1B, 2A, 2B, 3A and 3B. In particular, at least one of the processor 202 and the processor 302 may be configured to perform the method. The method shown in FIG. 5 can be combined with the method described above with reference to FIG. 4. That is, at least one of the UE 106 and the RAN 108 can be configured to perform both the method of FIG. 4 and the method of FIG. 5.

The method shown in FIG. 5 relates to determining a transmission mode for transmitting a message comprising control information for robotic device control. In step S502, obtaining module 206 obtains a count of consecutively not correctly received messages. In step S504, selecting module 208 selects one of a normal transmission mode and a robust transmission mode which is more robust than the normal transmission mode based on the obtained count. Selecting module 210 selects the robust transmission mode if the count equals or approaches the threshold. For example, the robust transmission mode is selected in case the count reaches a number (e.g., 2) which is lower than the predetermined threshold (e.g., 3) by a predetermined amount (e.g., 1). The robust transmission mode may be selected in case the count falls into a predetermined range (e.g., 2-3) or assumes a predefined value (e.g., 2) before the predetermined threshold (e.g., 3). In step S506, triggering module 210 triggers wireless transmission of the message with the selected transmission mode. The processor 202 may be configured to perform steps S502 to S506.

Figure 6:
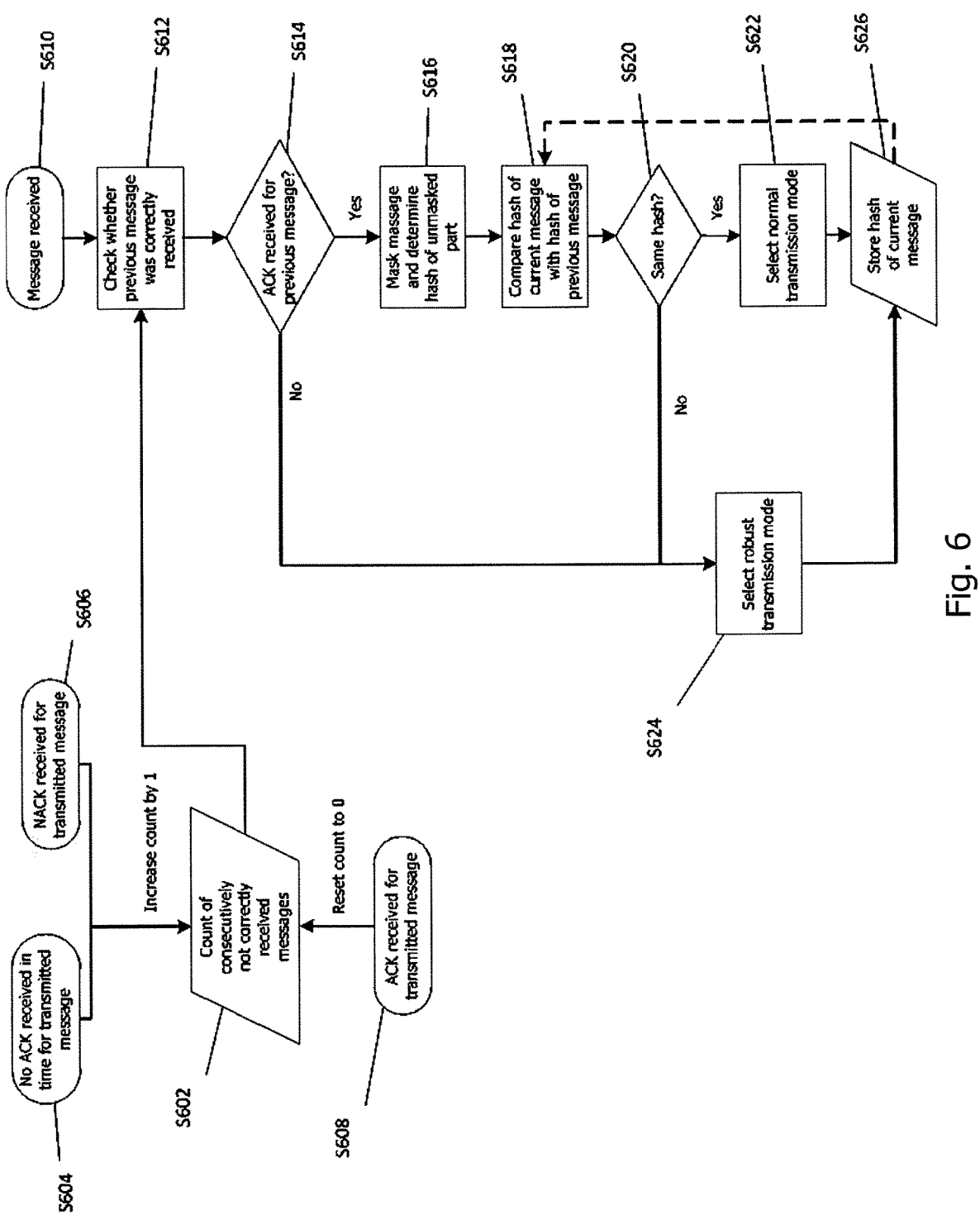
FIG. 6 illustrates a still further method embodiment of the present disclosure.

FIG. 6 shows a method embodiment of the present disclosure, which the apparatus described herein such as UE 106, RAN 108 or a separate component in communication with UE 106 and/RAN 108 is configured to perform. The method of FIG. 6 is an exemplary combination of the methods described above with reference to FIGS. 4 and 5.

In step S602, the count of consecutively not correctly received messages is obtained by processor 202, in particular by obtaining module 206. For each transmitted message a receiver (i.e., RAN 108) which received the transmitted message sends feedback. A positive acknowledgement, ACK, is sent for a correctly received message and if a corrupted message has been received, a negative acknowledgement, NACK, is sent. If a transmitter (i.e., UE 106) which transmitted the message did not receive any ACK within a predetermined time limit after sending the message, then a loss of the message is assumed. The predetermined time limit may correspond to or be lower than the time interval defined by the fieldbus protocol.

The number of consecutive packets for which no or no positive acknowledgement is received by the transmitter is counted. In case no ACK is received within the predetermined time limit for a transmitted message (S604) or in case a NACK is received for the transmitted message, the count is increased by 1. In case an ACK is received for the transmitted message (S608), the count is reset to 0. The count for consecutively not correctly received messages is determined on a transmission side.

In case UE 106 wirelessly transmits a message to RAN 108, the count is determined by processor 202 of UE 106. In this case, the count may be obtained by obtaining module 206. Also in this case, the ACK or NACK may be received by UE 106 from RAN 108 after controller 110 has correctly received the transmitted message. On the other hand, in case RAN 108 wirelessly transmits a message to UE 106, the count is determined by processor 302 of RAN 108. The count may in this case be obtained by obtaining module 306. Also in this case, the ACK or NACK may be received by RAN 108 from UE 106 after robot cell domain 100A has correctly received the transmitted message.

In step S610, the current message is received by the apparatus. The current message is received by UE 106 from robot cell domain 100A or the current message is received by RAN 108 from cloud computing domain 100C. In step S612, it is checked whether the previous message transmitted by the corresponding apparatus was correctly received. In particular, it is checked by UE 106 whether the previous message transmitted from UE 106 to RAN 108 was correctly received by RAN 108 or it is checked by RAN 108 whether the previous message transmitted from RAN 108 to UE 106 was correctly received by UE 106.

In case no ACK was received for the previous message, the count of consecutively not correctly received messages is increased by 1 and the method proceeds to step S624 described below. In case an ACK was received for the previous message, the count of consecutively not correctly received messages is reset to 0 and the method proceeds to step S616. In other words, before triggering transmission of a message, the count of consecutively not correctly received messages is checked. If it is 0, then the method proceeds to step S616. If the count is larger than 0, a robust transmission is required (e.g. a robust modulation scheme or multiple message transmission).

In step S616, the current message is masked and a hash of an unmasked part of the current message is determined. A hash of an unmasked part of the previous message may be obtained (for example from UE 106 or RAN 108) or determined by the apparatus. The determined hash of the unmasked part is compared with the hash of the unmasked part of the previous message in step S618. It is determined whether both hashes are similar, i.e., equal, to one another in step S620. If this is the case, the method proceeds to step S622 and the normal transmission mode is selected, for example by selecting module 208 or 308. If the two hashes are not similar to one another, the method proceeds to step S624. In step S624, the robust transmission mode is selected, for example by selecting module 208 or 308. The higher the count of consecutively not correctly received messages, the more robust is the selected transmission mode (e.g., double transmission of the message in case of the count equals 1 and triple transmission of the message in case the count equals 2).

The robust transmission mode is more robust than the normal transmission mode. For example, a higher transmission power may be selected compared to the normal transmission mode. Alternatively, or in addition, a modulation scheme can be applied for the robust transmission mode which is more reliable and results in lower probability of a loss of a message, i.e., ensures a higher chance of successful message transmission. For example, using 4-QAM instead of 64-QAM at the same transmission power or higher transmission power increases the chances for a successful transmission of a message. In general, radio mechanisms or transmission mechanisms which increase the probability of successful message transmission can be used for the robust transmission mode. To increase the probability, modulation and transmission power may be chosen appropriately.

The purpose of steps S616 to S620 is to identify a change in control information between the current message and the previous message. In general, most of the time the payloads of the consecutive messages are the same (e.g., because one and the same movement instruction is sent repeatedly in consecutive messages from the controller 110 or since the feedback data as determined by one of the sensors 104 does not change over messages consecutively received at the controller 110). However, when, for example, the controller 110 (e.g., in a PLC-based implementation) changes the value of a field in a memory area, then the payload of the forthcoming fieldbus message delivers this change to the corresponding robotic device 102. This mechanism is also the same in the opposite direction (e.g., in case the feedback data change due to a movement of the robotic device 102).

These messages are important messages from a reaction time point of view since they carry updated information. Thus, a reliable transmission of such messages should be ensured by selecting the robust transmission mode instead of the normal transmission mode for wirelessly transmitting these messages. Details on the identification of a change in control information will now be discussed with reference to FIG. 7.

Figure 7:
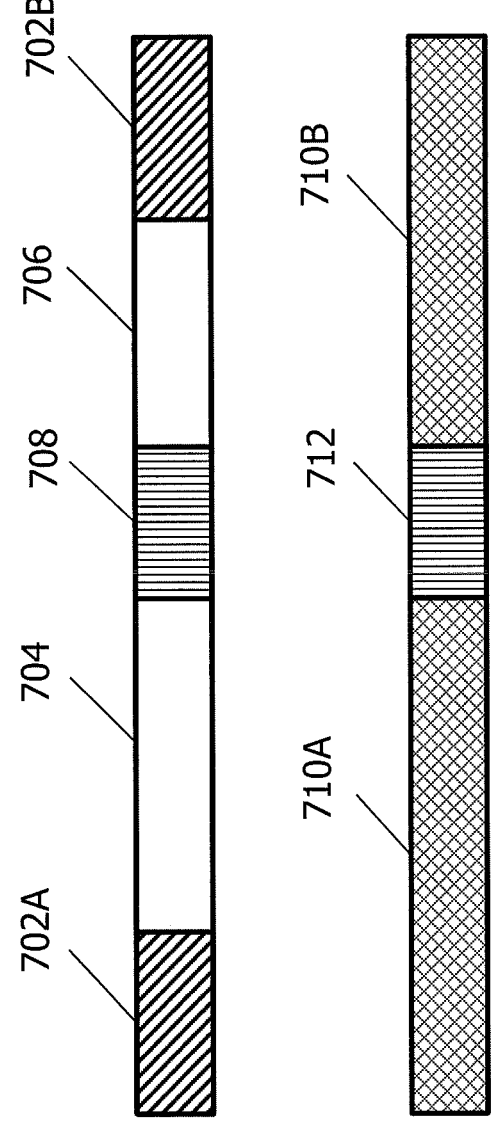
FIG. 7 illustrates masking of a message according to the present disclosure.

FIG. 7 shows a general overview of a structure of a message according to an exemplary fieldbus protocol and how the masking is performed according to the techniques disclosed herein, in particular the methods described above with reference to FIGS. 4 and 6 (see for example step S402 and steps S616 et seq.).

A part of the current message is masked and a hash code of the remaining unmasked part is calculated. The mask has two components. First, fieldbus protocol fields (fieldbus protocol header 702A and fieldbus protocol footer 702B) may be masked. Second, parts 704 and 706 of the message having no effect on reaction time even if they should change are masked. The second mask specification is based on application logic. It depends on the type of action to be performed by the robotic device 102. The mask selects the relevant fields, for example from a PLC memory area, from a reaction time point of view. For example, if the memory area contains several register values, and only one has impact on reaction time (e.g., its change triggers start/stop of a robotic device 102), then only that part 708 of the message is considered in hash code calculation. In the shown example, that part 708 represents the control information for robotic device control which has an effect on the reaction time. In general, parts of the message have an effect on reaction time which include a command relating to a movement of the robotic device 102, or which include feedback data from the robotic device 102 to be used in calculating a next control command for the robotic device 102. In the upper part of FIG. 7, four masked message parts 702A, 702B, 704 and 706 are illustrated.

By the masking operation, masked parts 710A and 710B as well as an unmasked part 712 of the message are determined (see lower half of FIG. 7). In the shown example, unmasked part 712 equals the part 708 of the message that represents the control information of interest. The hash is determined for unmasked part 712 only, and not for masked parts 710A and 710B.

The industrial application (e.g., the controller 110) can define more masks and assign a priority value for each mask. For example, the mask which masks header 702A and footer 702B can be assigned a low priority, whilst the mask which masks header 702A and footer 702B as well as parts 704 and 706 can be assigned a high priority. In case a change in an unmasked part between the previous message and the current message is identified based on a mask, the priority level of this mask is considered to select the robust transmission mode.

In the given example, a change may be identified in part 708 based on the mask with the associated high priority. A change may at the same time also be identified in parts 704, 706 and 708 based on the mask with the associated low priority. Then, the mask with the higher priority is chosen in order to select the robust transmission mode, wherein the robust transmission mode is selected based on the priority level of the chosen mask. For example, a change in a highest priority field (e.g., part 708) of the message requires as robust transmission as possible. For example, an identified change based on the mask with the associated low priority may originate from part 704. This change may not be that critical and thus, a transmission mode having a lower robustness may be selected. The masks and priority levels may be determined by the industrial application (i.e., controller 110) and obtained by the apparatus (i.e., UE 106 or RAN 108).

Figure 8:
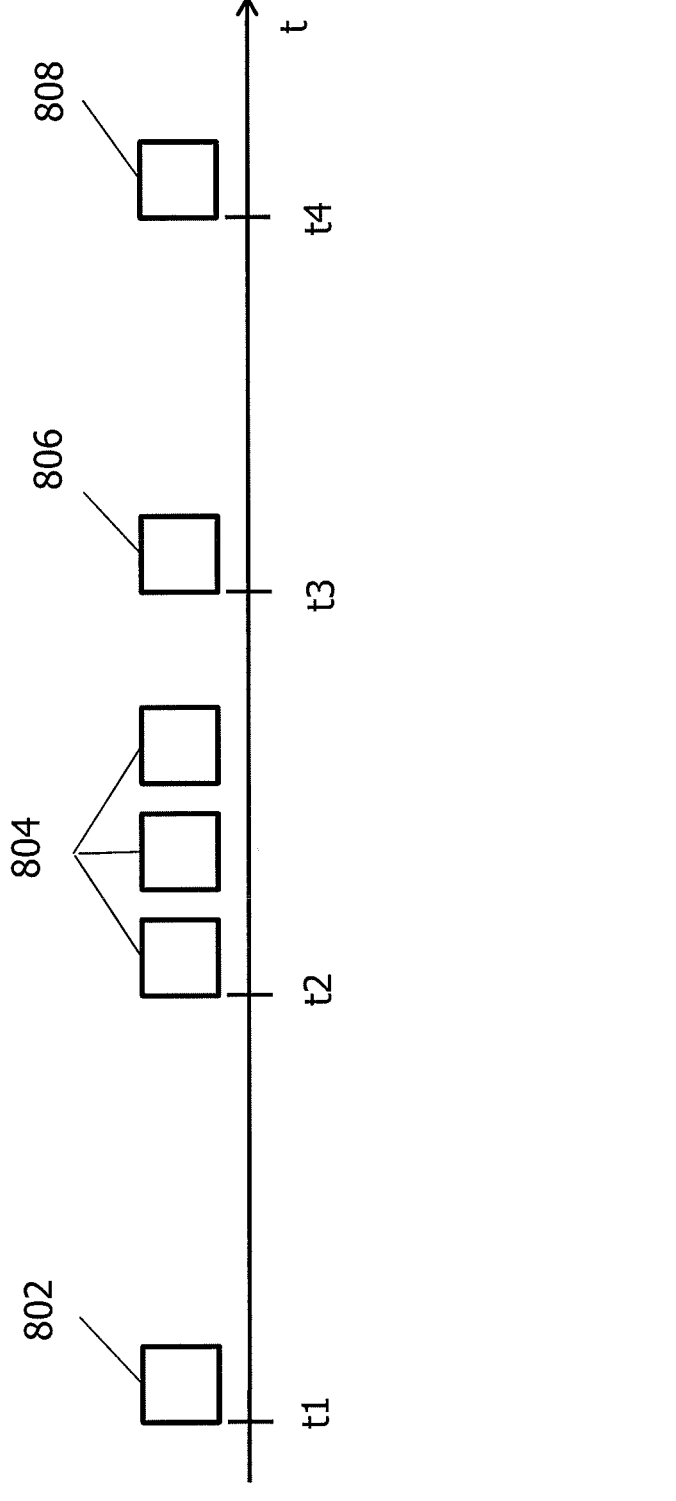
FIG. 8 illustrates a time sequence of message transmission according to the present disclosure.

FIG. 8 shows a time sequence of subsequently transmitted messages. The messages are transmitted after triggering transmission with a selected transmission mode, wherein the selection is performed according to the method of FIG. 4, 5 or 6. In other words, the UE 106 or the RAN 108 may be configured to transmit the message (also referred to as the current message) according to the shown time sequence of FIG. 8.

At a first point in time t1, a first message 802 is transmitted once. At a second point in time t2, a second message 804 is transmitted three times. This is because a robust transmission mode has been selected for transmitting the second message because a change in the control information has been identified between the first message 802 and the second message 804. Thus, the robust transmission mode has been selected for transmitting the second message.

At a third point in time t3, a third message 806 is transmitted once. The third message 804 is transmitted with a robust transmission mode which uses a more robust modulation scheme instead of multiple message transmission. Also this case, the robust transmission mode is selected due to a change in the control information between the second message 804 and the third message 806.

At a fourth point in time t4, a fourth message 808 is transmitted. The fourth message 804 is transmitted with the normal transmission mode since no change in control information between the third and the fourth message 808 has been identified based on the individual hash codes and since the third message 806 was correctly received and the count of subsequently not correctly received messages has been reset to 0 before transmitting the fourth message 808.

The technique presented herein may be implemented using a variety of robot programming tools and languages. For example, the robot programming language may be based on C++.

In summary, a fieldbus-aware wireless message transmission scheme is disclosed. Situations when robust transmission is required are identified pro-actively to avoid fieldbus connection failures that are reported to the controller 110 and possibly culminate in a stop of the robotic cell 101. Also, loss of messages is prevented, which loss increases the reaction time of the controller 110 and the robotic device 102.

The number of consecutively not correctly received (e.g., missing) messages is counted on the transmitter side. If the loss of a next message would result in a fieldbus connection failure, then that message is proactively transmitted in a more robust way using a robust transmission mode (e.g., using message duplication). In addition to this, or as an alternative, the robust transmission mode may be used when a change in the control information comprised in the current message compared to the previous one is identified.

The content of the current message, the content of the previous message and the transmission status of previous messages are thus determined in some variants. Based on this information, the transmission mode is selected to avoid a connectivity problem due to use of a wireless connection and to avoid an increase of reaction time.

The present technique makes a fieldbus-based connection more robust when it stretches over a wireless link. It also avoids an increase in reaction time due to inherent issues of wireless transmission mechanisms. In addition, radio resource usage can be minimized by avoiding unnecessary retransmissions.

Especially transmitting ProfiNet traffic over a wireless connection requires an ultra-reliable and low latency communication over the wireless connection. By taking into account the mechanisms of industrial applications and field-bus technologies in wireless transmission as described herein, the efficiency of the ultra-reliable and low latency communication can be enhanced.

While the present disclosure has been described with reference to exemplary embodiments, it will be appreciated that the present disclosure can be modified in various ways without departing from the scoop of the present disclosure as defined in the appended claims.

The invention claimed is:

1. An apparatus for selecting a transmission mode for wirelessly transmitting a message comprising control information for robotic device control, the apparatus comprising:
   a processor; and
   a memory coupled to the processor, wherein the memory stores one or more programs that, when executed by the processor, cause the apparatus to:
      compare a current message, which is to be transmitted after a previous message, with the previous message to identify a change in the control information from the previous message to the current message;
      select one of a normal transmission mode and a robust transmission mode which is more robust than the normal transmission mode for wireless transmission of the current message, wherein the apparatus is configured to select the robust transmission mode if a change in the control information is identified; and
      trigger wireless transmission of the current message with the selected transmission mode.

2. The apparatus of claim 1, wherein correct receipt of the previous message has been acknowledged.

3. The apparatus of claim 1, wherein the one or more programs, when executed by the processor, cause the apparatus to compare the current message with the previous message by performing at least the following steps:
   obtaining at least one part of the control information comprised in the current message;
   obtaining at least one part of the control information comprised in the previous message; and
   comparing the at least one part of the control information comprised in the current message with the at least one part of the control information comprised in the previous message.

4. The apparatus of claim 3, wherein the one or more programs, when executed by the processor, cause the apparatus to obtain the at least one part of the control information comprised in the current message by performing at least the following steps:
   masking at least one part of the current message to define at least one masked part and at least one unmasked part of the current message; and
   extracting the at least one unmasked part of the current message as the at least one part of the control information comprised in the current message.

5. The apparatus of claim 4, wherein the one or more programs, when executed by the processor, cause the apparatus to mask at least one of:
   a protocol field comprised in the current message; and
   a message part which has no effect on a reaction time of a robotic device to be controlled.

6. The apparatus of claim 4, wherein the one or more programs, when executed by the processor, cause the apparatus to:
   apply a plurality of different masks to define at least one masked part and at least one unmasked part for each of the different masks, wherein each one of the plurality of masks has an associated priority level; and
   extract the at least one unmasked part as the at least one part of the control information separately for each one of the plurality of masks.

7. The apparatus of claim 6, wherein the one or more programs, when executed by the processor, cause the apparatus to:
   compare the at least one unmasked part of the control information comprised in the current message with the at least one unmasked part of the control information comprised in the previous message, for each one of the plurality of masks, to identify a change in the control information from the previous message to the current message;
   determine one of the plurality of masks associated with the change in the control information; and
   select the robust transmission mode based on the priority level associated with the determined mask.

8. The apparatus of claim 7, wherein the one or more programs, when executed by the processor, cause the apparatus to determine one of the plurality of masks based on which a change in the control information from the previous message to the current message is identified.

9. The apparatus of claim 3, wherein the one or more programs, when executed by the processor, cause the apparatus to obtain the at least one part of the control information comprised in the previous message by performing at least the following steps:
   masking at least one part of the previous message to define at least one masked part and at least one unmasked part of the previous message;
   extracting the at least one unmasked part of the previous message as the at least one part of the control information comprised in the previous message.

10. The apparatus of claim 3, wherein the one or more programs, when executed by the processor, cause the apparatus to compare the current message with the previous message by performing at least the following steps:
   obtaining a first hash of the at least one part of the control information comprised in the current message;
   obtaining a second hash of the at least one part of the control information comprised in the previous message; and
   comparing the first hash with the second hash.

11. The apparatus of claim 10, wherein the one or more programs, when executed by the processor, cause the apparatus to identify a change in the control information from the previous message to the current message based on a result of comparing the first hash with the second hash.

12. The apparatus of claim 11, wherein the one or more programs, when executed by the processor, cause the apparatus to identify a change in the control information from the previous message to the current message in case the first hash is not equal to the second hash.

13. The apparatus of claim 1, wherein the robust transmission mode comprises at least one of:
   transmitting the current message more often than with the normal transmission mode; and
   transmitting the current message using a modulation scheme which is more robust than a modulation scheme of the normal transmission mode.

14. The apparatus of claim 1, configured to be connected to the robotic device via a fieldbus connection.

15. The apparatus of claim 1, configured to be connected to a controller via a fieldbus connection.

16. A system comprising:

a robotic device; and an apparatus for selecting a transmission mode for wirelessly transmitting a message comprising control information for robotic device control, wherein at least a portion of a communication link between the apparatus and the robotic device is a fieldbus connection, wherein the apparatus is configured to:

compare a current message, which is to be transmitted after a previous message, with the previous message to identify a change in the control information from the previous message to the current message;

select one of a normal transmission mode and a robust transmission mode which is more robust than the normal transmission mode for wireless transmission of the current message, wherein the apparatus is configured to select the robust transmission mode if a change in the control information is identified; and trigger wireless transmission of the current message with the selected transmission mode.

17. The system of claim 16, wherein the robotic device comprises a robot controller configured to:

control the robotic device based on control information comprised in a message received by the apparatus.

18. The system of claim 16, wherein the robotic device comprises a robot controller configured to generate the current message or the message comprising the control information based on a current state of the robotic device.

19. The system of claim 16, further comprising a controller, wherein at least a portion of a communication link between the apparatus and controller is a fieldbus connection.

20. The system of claim 19, wherein the controller is configured to determine desired control information based on control information comprised in a message received by the apparatus.

21. The system of claim 19, wherein the controller is configured to generate the current message or the message comprising the control information.

* * * * *